(12) United States Patent
Frohlund

(10) Patent No.: US 8,164,571 B2
(45) Date of Patent: Apr. 24, 2012

(54) SLIDEABLE KEYBOARD FOR AN ELECTRONIC EQUIPMENT

(75) Inventor: Stig Frohlund, Hassleholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 740 days.

(21) Appl. No.: 11/911,163

(22) PCT Filed: Apr. 6, 2006

(86) PCT No.: PCT/EP2006/003120
§ 371 (c)(1),
(2), (4) Date: Apr. 1, 2008

(87) PCT Pub. No.: WO2006/108548
PCT Pub. Date: Oct. 19, 2006

(65) Prior Publication Data
US 2009/0051658 A1  Feb. 26, 2009

Related U.S. Application Data

(60) Provisional application No. 60/673,712, filed on Apr. 21, 2005.

(30) Foreign Application Priority Data

Apr. 11, 2005  (EP) ..................................... 05388033

(51) Int. Cl.
*G06F 3/02* (2006.01)
*G09G 5/00* (2006.01)
(52) U.S. Cl. ...... 345/169; 345/168; 345/172; 455/550.1; 455/575.4; 455/575.1; 379/433.12; 379/433.07
(58) Field of Classification Search ............... 455/575.4; D14/138 AD, 138 AA
See application file for complete search history.

(56) References Cited

U.S. PATENT DOCUMENTS

| 6,748,249 B1 * | 6/2004 | Eromaki et al. ........... 455/575.4 |
| 6,842,626 B1 | 1/2005 | Kubo et al. ................ 455/550.1 |
| D525,959 S * | 8/2006 | Kim et al. ............. D14/138 AD |
| D547,743 S * | 7/2007 | Kim et al. ............. D14/138 AA |

(Continued)

FOREIGN PATENT DOCUMENTS

CN  2777865 (Y)  5/2006

(Continued)

OTHER PUBLICATIONS

International Search Report, Completed Jun. 20, 2006. Official Action from Russian Patent Office issued on Mar. 25, 2010.
Translation of Official Action from Russian Patent Office issued on Mar. 25, 2010.

*Primary Examiner* — Nitin Patel
*Assistant Examiner* — Christopher Thompson
(74) *Attorney, Agent, or Firm* — Myers Bigel Sibley & Sajovec

(57) ABSTRACT

An electronic equipment (1) comprising a casing (10) having a front surface (11); a display (20); a mechanical keypad (30); and a set (40) of navigation and function/control keys, said display (20) and keypad (30) being arranged adjacent to one another on the front surface (11), the set (40) of navigation and function/control keys, being arranged to be slideably displaced by a user of the electronic equipment (1) to different positions on said front surface (11), including a first position where a section of the display is visible, the entire keypad is visible, and the set and the key pad complement each other; and a second position where the entire display is visible and the set (40) covers the keypad.

12 Claims, 2 Drawing Sheets

U.S. PATENT DOCUMENTS

| | | | |
|---|---|---|---|
| D560,196 S * | 1/2008 | Kim et al. | D14/138 AA |
| 7,369,884 B2 * | 5/2008 | Park et al. | 455/575.4 |
| 7,388,578 B2 * | 6/2008 | Tao | 345/173 |
| 2005/0079902 A1 * | 4/2005 | Chen et al. | 455/575.4 |
| 2005/0245297 A1 * | 11/2005 | Lee et al. | 455/575.4 |
| 2006/0063569 A1 * | 3/2006 | Jacobs et al. | 455/575.1 |
| 2006/0199607 A1 * | 9/2006 | Shi et al. | 455/550.1 |

FOREIGN PATENT DOCUMENTS

| | | |
|---|---|---|
| CN | 1694366 (A) | 11/2009 |
| EP | 0 804 009 A1 | 10/1997 |
| EP | 1 298 888 A1 | 9/2001 |
| EP | 1 713 236 A1 | 10/2006 |

\* cited by examiner

SLIDEABLE KEYBOARD FOR AN ELECTRONIC EQUIPMENT

RELATED APPLICATIONS

The present application is a 35 U.S.C. §371 national phase application of PCT International Application No. PCT/EP2006/003120, having an international filing date of Apr. 6, 2006 and claiming priority to European Patent Application No. 05388033.2 filed Apr. 11, 2005, and U.S. Patent Application No. 60/673,712 filed Apr. 21, 2005 the disclosures of which are incorporated herein by reference in their entireties. The above PCT International Application was published in the English language and has International Publication No. WO 2006/108548.

TECHNICAL FIELD

The invention relates to an electronic equipment comprising a casing having a front surface; a display; a mechanical keypad; and a set of navigation and function/control keys, said display and keypad being arranged adjacent to one another on the front surface.

RELATED PRIOR ART

The development process for electronic equipment, such as mobile telephones has seen an change in the equipment from rather big, "bulky" and unhandy to ever smaller devices. This development has been made possible by the reduced size of the electronic components that makes the phones work. The length of such mobile phones (the smallest are well below 100 mm in length) has reached a minimum size where the advantage of small size namely that it can easily be carried in a pocket or the like has been out-weighed by the disadvantage that the handling of a small object is difficult.

There is thus a need to provide an electronic device with a big display, and an easy-to-use keypad, which still fit in a pocket.

Many devices are known in the art that tries to fulfill this need. Examples are clamshell-type and jackknife-type mobile phones that are small phones that fit in the pocket but can be opened in order to provide an increased surface for placing displays that are large enough to display information and keypads with keys that can be hit with normal size fingers. Another example is the slide-type mobile telephone, represented, e.g. by GB 2 393 066 A, having display and keypad parts slideably arrange with respect to each other. These mobile telephones serves the purpose of increasing the size of the outer surface of the telephone but renders the devices more susceptible to damage and wear because the openable parts can easily be twisted with respect to each other. Also some of these devices can be difficult to use because the orientation of the parts with respect to each other may require the turning of the device in order to use certain features or combinations of features.

Common to the clamshell, jackknife, and slide phones is that they by their nature are thicker than a traditional stick phone, since they must comprise two casing parts. Compared to the stick-phones they all have a longer distance between the keys and the display. The clamshell type typically has the navigation device and soft keys situated in one casing part and the display in the other casing part of the phone. Between the parts there is usually a bulky hinge-mechanism. This makes the connection between the soft keys and the display harder to understand for the user. Soft keys are keys that by being pressed evoke some function that is related to a state or situation of the mobile phone. The consequence of pressing a soft key therefore varies from situation to situation. Usually the present function of the soft key is displayed in the display. Therefore it is advantageous that the soft keys are situated close to the display. With the jack knife and the slide type phones there is also a high "step up" from the main key pad usually situated in a lower part, and the navigation device usually situated in an upper casing part. The electrical connection between the two casing parts for all the above types needs to be quite complex and expensive due to the fact that the LCD and acoustic components are positioned in the upper casing part and the logic circuits in the lower casing part.

From the United States patent application US 2003/0112225 A1 a mobile telephone having a large touch screen display virtually covering the entire front surface of the device is known. Over the touch screen display a slideable key pad is arranged on a series of lamellae. These lamellae can be slid like a Venetian blind from the front surface of the device to the back side of the device. This device increases the useful area of the front of the device, but has a series of disadvantages. The use of a touch screen in a display requires that additional films are applied at least in those areas of the display where the touch function needs to be applied. This reduces the display quality in those areas. Further, the lamellae that need to be slideable round the back of the device, take up a lot of space inside the phone, such that the phone needs to be made larger, in order for the phone to support the usual functionalities of such a device. Further, due to the lamellae on the back side of the phone the use of the back surface area of the phone for functional features is severely limited or made impossible. Also, the lamellae having to be turned from the front surface to the back surface of the phone constitutes a rather complex mechanical construction, where there is a considerable risk that the lamellae get stuck, during the sliding process. The buttons on the lamellae work by touching on an area of the touch screen. This however does not apply in the situation where the lamellae are completely withdrawn.

OBJECT OF THE INVENTION

It is an object of the present invention to provide an electronic equipment that overcomes the problems of the prior art. It is a further object of the invention to provide an alternative electronic equipment that allows a large display and an easy to use keyboard, and which still fits in the pocket of a user.

SUMMARY OF THE INVENTION

The object of the invention is achieved by an electronic equipment comprising a casing having a front surface; a display; a keypad comprising alphanumerical keys; and a set of navigation and function/control keys, the display and the keypad being arranged adjacent to one another on the front surface, wherein the set of navigation and function/control keys, is arranged to be slideably displaced along an axis A of the casing by a user of the electronic equipment to different positions on said front surface, including a position where sections of the front surface are visible on both sides of the set of navigation and function/control keys in a direction along axis A.

Thereby an alternative electronic device is obtained that overcomes the problems of the prior art. It is robust to accidental blows to the equipment, since no parts of the set of navigation and function/control keys needs to protrude beyond the front surface. Further, it allows the set of navigation and function/control keys to be in close contact with the front surface 11 which increases the robustness. Furthermore, a very simple, and thus reliable and durable mechanical connection between the casing and the set of navigation and function/control keys is obtained. It is further obtained that the set of navigation and function/control keys and the numerical keypad can be brought into a position where they complement each other in order to perform operations of the electronic equipment where the functions of each of these parts are needed and another position where only the set of navigation and function/control keys are available and complement an enlarged display area to perform operations of the electronic equipment such as games, image editing/manipulation, etc. A large display area can thus be provided on e.g. a stick type mobile phone, along with a keypad that is large enough to handle, without compromising the quality of the image in the display.

In an embodiment of the invention the set of navigation and function/control keys, can be slideably displaced between a first position where a section of the display is visible, the entire keypad on the front surface is visible, and the set of navigation and function/control keys and the key pad complement each other; and a second position where the entire display is visible and the set of navigation and function/control keys covers the keypad.

In a preferred embodiment the keypad is a mechanical keypad comprising buttons that are displaceable with respect to the front surface in a direction perpendicular thereto. Thereby, a tactile response is provided.

The set of navigation and function/control keys may be arranged on a plate shaped element.

Preferably first sliding means are arranged on the plate shaped element, said first sliding means being adapted for cooperation with second sliding means on the casing.

In an embodiment said first sliding means are arranged on a bottom surface of the plate shaped element, and said second sliding means are arranged on the front surface of the casing.

In another embodiment of the invention the plate shaped element further comprises flanges arranged perpendicular to the plate shaped element, said flanges extending to partly cover the side surfaces of the casing, and said first sliding means are arranged on said flanges cooperating with second sliding means on the side surfaces of the casing.

Preferably the above mentioned sliding means form a tongue and groove type connection.

In a preferred embodiment the plate shaped element is biased towards said first and second positions.

The above mentioned bias may be provided by a spring arranged on a side surface of said casing being adapted for abutment against parts of the plate shaped element.

In all of the above mentioned embodiments the electronic equipment may preferably be a mobile telephone.

It should be emphasized that the term "comprises/comprising" when used in this specification is taken to specify the presence of stated features, integers, steps or components but does not preclude the presence or addition of one or more other features, integers, steps, components or groups thereof.

The term electronic equipment includes portable radio communication equipment. The term portable radio communication equipment, which herein after is referred to as a mobile radio terminal, includes all equipment such as mobile telephones, pagers, communicators, i.e. electronic organizers, smart-phones or the like.

DESCRIPTION OF THE DRAWINGS

The invention will be described in detail in the following with reference to the drawings in which.

DETAILED DESCRIPTION OF EMBODIMENTS OF THE INVENTION

Figure 1:
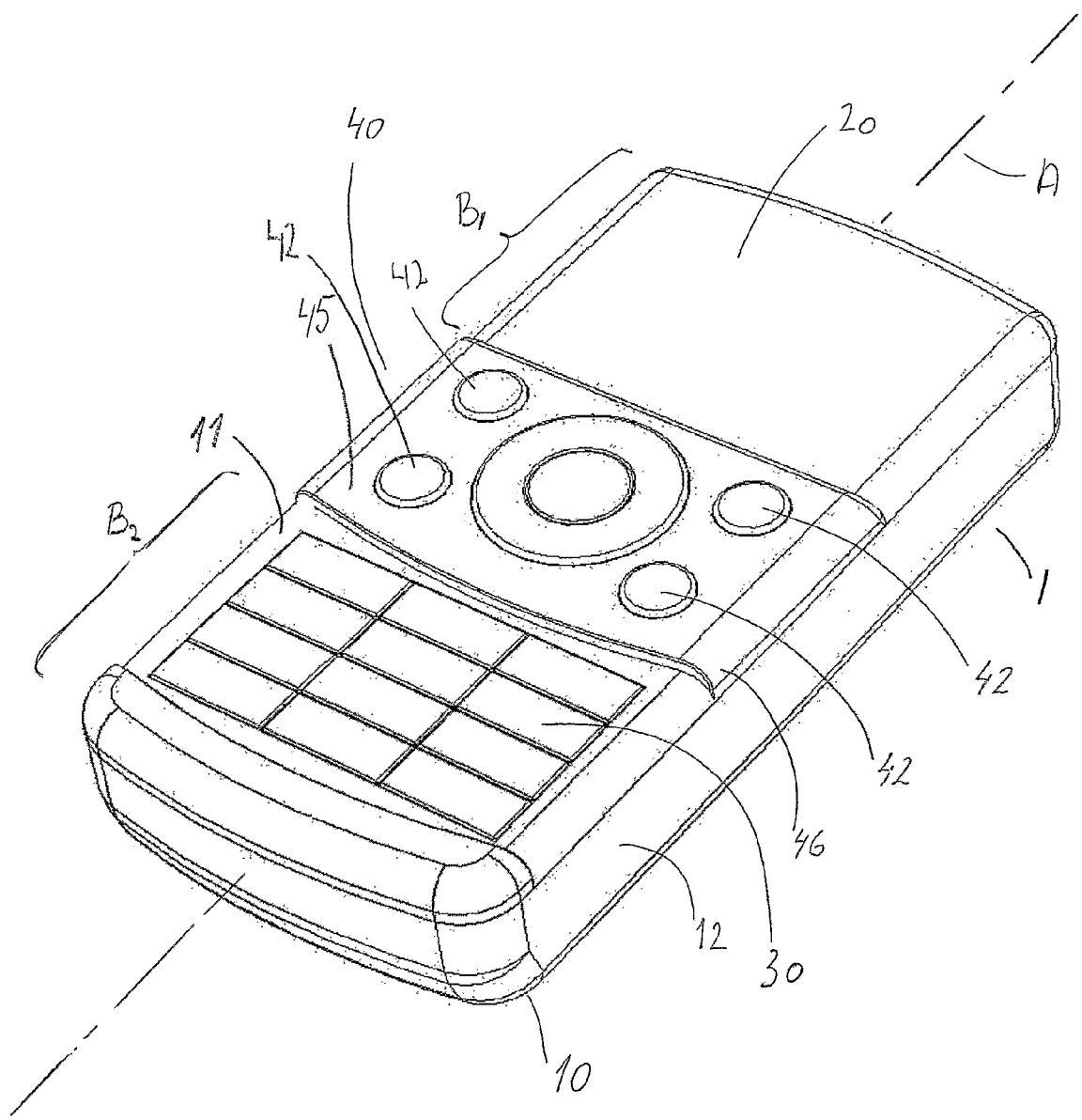
FIG. 1 is a perspective view of an electronic equipment with a slideable keyboard in a first terminal position.

Referring firstly to FIG. 1, showing an electronic equipment 1 in the form of a mobile telephone of the so called stick-type, the electronic equipment 1 comprises a casing 10 having an upper or front surface 11, a display 20 provided in the upper surface 11, and a keypad 30 also provided in the upper surface 11. The keypad 30 and the display 20 are arranged adjacent to each other in the upper surface 11. On the back side of the electronic equipment 1 opposite to the upper surface 11, a lid (not shown) may provide access to batteries, SIM-cards etc. Also, the back side may be provided with additional functionalities such as cameras, extra displays, infrared ports, etc.

Further, in FIG. 1 it is shown that a set 40 of navigation and function/control keys is provided on a plate shaped element 45 that is arranged over the front or upper surface 11 of the casing 10. The plate shaped element 45 with the set 40 of navigation and function/control keys thus constitutes an upper key pad different from and separate from the lower or main keypad 30 provided in the upper surface 11 of the casing 10.

The set 40 of navigation and function/control keys provided on the plate shaped element 45 comprises at least one navigation device 41 in the form of a rocker-key, a track pen, a track ball or the like adapted for navigating a pointer or similar marker in the display 20. The set 40 of navigation and function/control keys may further comprise a few control/function keys 42, preferably four keys 42 for use as soft keys, clear-key and back-key. Alternatively or additionally, the set 40 of navigation and function/control keys may also comprise a set of special buttons for controlling music or pictures/films, e.g. forward/rewind, pause/play buttons or the like. Furthermore, as an alternative or as an addition, the set 40 of navigation and function/control keys may also comprise a set of game control buttons.

The lower or main keypad 30 provided integrated in the front surface 11 of the casing 10 preferably comprises the numerical keys, i.e. 0-9, +, #, and *-keys, etc. Thus the set 40 of navigation and function/control keys and the keypad 30 complements each other in forming a full keyboard traditionally found on electronic equipment 1, such as stick-type mobile telephones and such.

In one embodiment of the invention the keypad 30 can be arranged on the front surface 11 of the casing 10 in a separate display, not shown, i.e. separate from the main display 20, as a touch screen. In an alternative embodiment the entire front surface 11 of the casing 10 is covered by a display in which at least a section thereof is provided with means such that this section may function as a touch screen keypad. However, in a preferred embodiment the key pad 30 is a mechanical keypad comprising actual physical buttons in the sense that they are displaceable with respect to the front surface in a direction perpendicular thereto.

The plate shaped element 45, and thereby the set 40 of navigation and function/control keys, is slideably arranged over the front or upper surface 11 of the casing 10, such that it is slideable in a plane parallel to said upper surface 11, and such that the sliding plate shaped element 45 can be moved between two terminal positions on the front surface of the casing part.

Thus the plate shaped element 45 is arranged to be slideably displaced along an axis A of the casing 10 by a user of the electronic equipment 1 to different positions on said front surface 11, including a position where sections $B_1$, $B_2$ of the front surface 11 are visible on both sides of the set 40 of navigation and function/control keys in a direction along axis A.

In FIG. 1 the set 40 of navigation and function/control keys on the plate shaped element 45 is shown in a first position where it covers a section of the display 20, and a section, $B_1$, of the front surface 11, i.e. the remaining part of the display 20, is visible above the plate shaped element 45, and a section B2 of the front surface 11, i.e. the numerical main/lower keypad 30, is visible below the plate shaped element 45.

Figure 2:
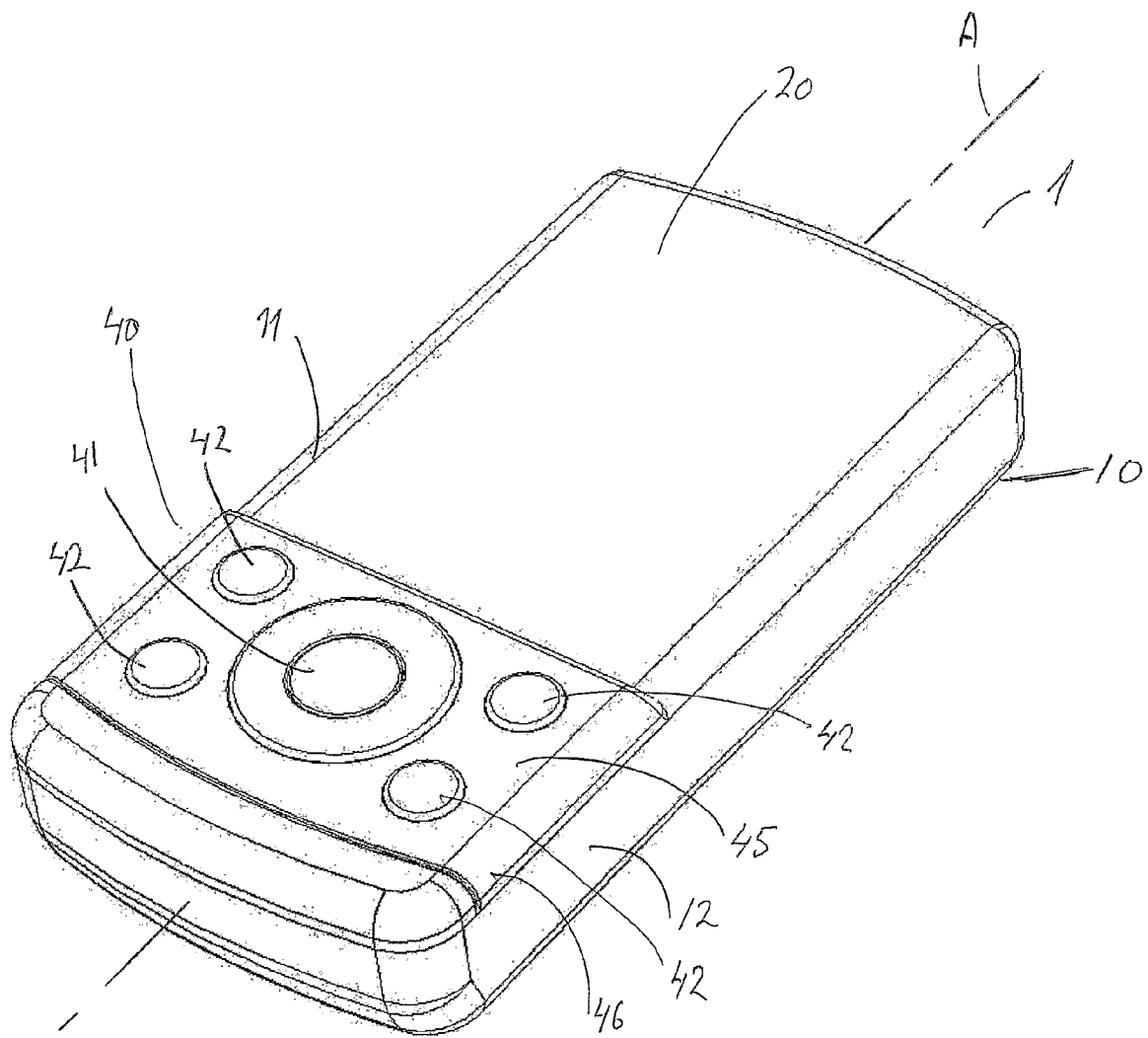
FIG. 2 is a perspective view of the electronic equipment shown in FIG. 1 with a slideable keyboard in a second terminal position.

In FIG. 2 the set 40 of navigation and function/control keys on the plate shaped element 45 is shown in a second terminal position where it covers the keypad 30, making the entire display visible for the user, exposing to the user, the section of the display 20 that was hidden in the first terminal position. In the embodiment shown, the plate shaped element 45 is essentially the same size as the key pad 30, such that the plate shaped element 45 covers the entire keypad 30. However, in alternative embodiments the plate shaped element may cover a smaller area than the keypad 30, thus leaving parts of the keypad visible and/or accessible to the user.

In the first terminal position, where the display 20 is partially hidden under the slideable plate shaped element 45, and the keypad 30 is accessible to the user, the electronic equipment 1 may advantageously be used for making phone calls to receivers with telephone numbers not stored in a phone book (which is a typical feature of such an electronic device 1, especially if the device is a mobile telephone), or for writing SMS. For such activities it is not important to have access to the entire display.

In the second terminal position, where the entire display 20 is visible to the user, and the slideable plate shaped element 45 covers the keypad 30, the electronic equipment 1 may advantageously be used for activities where a large display is expedient, e.g. finding a telephone number stored in a phone book of the equipment, playing games stored in the equipment, or viewing pictures or pages on the internet. For these activities the numerical keys are of less importance, and the set 40 of navigation and function/control keys are adequate.

The plate shaped element 45 is in the embodiment shown provided with flanges 46 that extend in a direction perpendicular to the plate shaped element 45 and to cover a part of a side surface 12 of the casing 10, on each side thereof. The flanges 46 are preferably provided with sliding means (not shown) that is adapted for cooperating with sliding means (not shown) on the side surfaces 12 of the casing, e.g. a tongue and groove arrangement or the like. Such a tongue and groove like arrangement may be provided by a T-shaped protrusion on the flanges 46 of the plate shaped element 45, said protrusion cooperating with corresponding elongate recesses on the casing 10.

Alternatively, the casing 10 and the slideable plate shaped element 45 may be provided with corresponding sliding means on the bottom of the plate shaped element 45 and on the front surface 11 of the casing.

Thus, the plate shaped element 45 and consequently the set 40 of navigation and function/control keys is slideable only over the front surface 11 of the casing 10. Consequently, the back side of the electronic equipment 1 can be utilized for placing functional features, e.g. cameras.

The sliding means on the casing 10 is provide with stops, such that the movement of the plate shaped element 45 cannot be extended such that the plate shaped element 45 extends beyond the front surface 11 of the casing. Thus, no parts of the plate shaped element 45 can unintentionally be twisted with respect to the casing 10 and thus the electronic equipment 1 is less susceptible to damage as compared to e.g. slide-type telephones.

The electronic equipment 1 may be provided with a spring, not shown, on each side surface 12 of the casing 10, such that the movement of the plate shaped element 45 with the set 40 of navigation and function/control keys between the first and second terminal positions is spring loaded. The spring is preferably a circular spring located such that it may abut parts of the plate shaped element 45 or the flanges 46 thereon, in such a manner that when pushing/sliding the set 40 of navigation and function/control keys from the first terminal position towards the second terminal position the spring force of the spring counteracts the movement in the sliding direction until the plate shaped element 45 is slid half way between the first and the second terminal positions, and then after reaching the half way position the spring force acts in the sliding direction. Thus, a mechanism is provided that will urge the plate shaped element 45 to be positioned in either of the terminal positions shown in FIGS. 1 and 2 respectively. Other spring types may provide the same kind of functionality, e.g. coil or leaf springs. Alternatively, magnets can be used to provide this functionality as well. Thus, a set of mutually attracting magnets can be arranged at each end of the plate shaped element 45 or flange 46 and on the casing at positions close to either of the terminal positions shown in FIGS. 1 and 2, respectively. Alternatively, one set of mutually repulsing magnets may be applied, one situated on the plate shaped element 45 and one on the casing 10, arranged such that the repulsion will force the plate shaped element to either of the terminal positions shown in FIGS. 1 and 2. In a further alternative embodiment this function may be provided by a resiliency and shape of the plate shaped element 45 and/or the flanges in cooperation with abutment against the casing 10, e.g. by providing the flanges and casing with opposed arc shaped forms. In yet an alternative embodiment the position of the plate shaped element 45 on the front surface 11 of the casing 10 may be controlled by an electric motor controlled by the logic circuit provide in the casing 10.

The invention claimed is:
1. An electronic device comprising:
a casing having a front surface;
a display;
a keypad comprising alphanumerical keys that are arranged at fixed locations relative to the display so that the alphanumerical keys are displaceable in a direction perpendicular to the front surface;
a set of navigation and function/control keys arranged on a slidable element, the display and keypad being arranged adjacent to one another on the front surface, wherein the slidable element with the set of navigation and function/control keys thereon is arranged to be slideably displaced along an axis of the casing by a user of the electronic device to different positions on the front surface, including a position where sections of the front surface are visible on both sides of the set of navigation and function/control keys in a direction along an axis and a second position where the slidable element with the set of navigation and function/control keys thereon completely covers the keypad when the slidable element with the set of navigation and function/control keys thereon is in the second position; and a bias mechanism to bias the set of navigation and function/control keys towards the second position when the set of navigation and function/control keys is located between an intermediate position and the second position, and to bias the set of navigation and function/control keys away from the second position when the set of navigation and function/control keys is located between the intermediate position and a position where the entire keypad on the front surface is visible.

2. An electronic device according to claim 1, wherein the slidable element on which the set of navigation and function/control keys are arranged comprises a plate shaped element.

3. An electronic device according to claim 2, wherein first sliding means are arranged on the plate shaped element, the sliding means being adapted for cooperation with second sliding means on the casing.

4. An electronic device according to claim 3, wherein the first sliding means are arranged on a bottom surface of the plate shaped element, and the second sliding means are arranged on the front surface of the casing.

5. An electronic device according to claim 3, wherein the plate shaped element further comprises flanges arranged perpendicular to the plate shaped element, the flanges extending to cover a portion of side surfaces of the casing, and the first sliding means are arranged on the flanges cooperating with second sliding means on the side surfaces of the casing.

6. An electronic device according to claim 3, wherein the sliding means form a tongue and groove type connection.

7. An electronic device according to claim 1, wherein the electronic device is a mobile telephone.

8. An electronic device according to claim 1, wherein the intermediate position is located between the first position and the second position.

9. An electronic device according to claim 8, wherein the first position and the second position are terminal positions for a sliding displacement of the set of navigation and function/control keys along the axis.

10. An electronic device according to claim 1, wherein the bias mechanism biases the set of navigation and function/control keys towards the second position when the set of navigation and function/control keys is located between the intermediate position and the second position.

11. An electronic device according to claim 1, wherein the bias mechanism includes a spring arranged on a side surface of the casing.

12. An electronic device according to claim 1, wherein the bias mechanism includes magnets.

* * * * *